United States Patent
Yuan et al.

(10) Patent No.: US 12,172,203 B2
(45) Date of Patent: Dec. 24, 2024

(54) OVERLAPPING AND PROGRESSIVE FORMING METHOD FOR HIGH-PERFORMANCE MULTI-ELEMENT NiAl-BASED ALLOY TUBULAR PART

(71) Applicant: Dalian University of Technology, Dalian (CN)

(72) Inventors: Shijian Yuan, Dalian (CN); Ying Sun, Dalian (CN)

(73) Assignee: Dalian University of Technology, Dalian (CN)

( * ) Notice: Subject to any disclaimer, the term of this patent is extended or adjusted under 35 U.S.C. 154(b) by 457 days.

(21) Appl. No.: 17/724,879

(22) Filed: Apr. 20, 2022

(65) Prior Publication Data

US 2023/0182188 A1    Jun. 15, 2023

(30) Foreign Application Priority Data

Dec. 14, 2021   (CN) .......................... 202111542502.3

(51) Int. Cl.
| | |
|---|---|
| *B21C 47/04* | (2006.01) |
| *B21C 37/14* | (2006.01) |
| *B21C 37/30* | (2006.01) |
| *B21C 47/06* | (2006.01) |
| *B21C 47/26* | (2006.01) |

(Continued)

(52) U.S. Cl.
CPC ............ *B21C 47/045* (2013.01); *B21C 37/14* (2013.01); *B21C 37/30* (2013.01); *B21C 47/063* (2013.01); *B21C 47/26* (2013.01); *C22C 19/007* (2013.01); *C22C 21/00* (2013.01)

(58) Field of Classification Search
CPC ....... B21C 47/045; B21C 47/04; B21C 47/26; B21C 47/063; B21C 37/14; B21C 37/30; B21C 37/16; B21C 37/154; B21C 37/06; B21C 43/02; C22C 19/007; C22C 19/03; C22C 21/00; B23K 2103/18; B23K 20/103; B21D 26/033; B21D 26/053; C22B 4/06; C23C 14/16; C23C 14/165; C23C 14/35; C23C 14/352; C23C 14/5806

See application file for complete search history.

(56) References Cited

FOREIGN PATENT DOCUMENTS

| | | | |
|---|---|---|---|
| CN | 102744310 A | * 10/2012 | |
| CN | 110142332 A | * 8/2019 | ........... B21D 26/041 |

(Continued)

*Primary Examiner* — Bayan Salone
(74) *Attorney, Agent, or Firm* — Reising Ethington P.C.

(57) ABSTRACT

An overlapping and progressive forming method for a high-performance multi-element NiAl-based alloy tubular part, including: winding continuously flexible substrates of Ni and Al, and alloying coating continuously or selectively along a width direction or a rolling direction to obtain coated flexible substrates; winding continuously the coated flexible substrates on an outer surface of a core roller according to a sequence of Ni above and Al below to form a Ni/Al laminated structure having a plurality of layers with an outermost layer being a Ni layer, and consolidating with ultrasonic with assistance of a pulse current to combine the continuously wound flexible substrates into a laminated tube blank; and placing the laminated tube blank into a mold, applying a pulse current to both ends of the laminated tube blank for hot fluid high-pressure forming, and synthesizing in-situ to prepare the tubular part with assistance of the pulse current.

10 Claims, 3 Drawing Sheets

(51) Int. Cl.
*C22C 19/00* (2006.01)
*C22C 21/00* (2006.01)

(56) References Cited

FOREIGN PATENT DOCUMENTS

| | | | | |
|---|---|---|---|---|
| CN | 111168407 A | * | 5/2020 | ........... B21D 26/027 |
| CN | 111804810 A | * | 10/2020 | ............. B21D 33/00 |
| EP | 0480404 A2 | * | 4/1992 | ........... C23C 28/345 |
| WO | WO-2019009766 A1 | * | 1/2019 | ............. B21D 35/00 |

* cited by examiner

```
┌─────────────────────────────────────────────┐
│ Alloying coating Ni and Al flexible substrates │
│  in a winding mode by magnetron sputtering  │
└─────────────────────────────────────────────┘
                      │
                      ▼
┌─────────────────────────────────────────────┐
│  Winding continuously the substrates on an outer │
│    surface of a core roller and consolidating with │
│  ultrasonic with assistance of a pulse current to │
│        prepare a laminated tube blank       │
└─────────────────────────────────────────────┘
                      │
                      ▼
┌─────────────────────────────────────────────┐
│      Subjecting the laminated tube blank to │
│         hot fluid high-pressure forming     │
│      with assistance of the pulse current   │
└─────────────────────────────────────────────┘
                      │
                      ▼
┌─────────────────────────────────────────────┐
│   Applying continuously the pulse current to the │
│   tubular part and reaction synthesizing in-situ in a │
│  mold to prepare a high-performance multi-element │
│         NiAl-based alloy tubular part       │
└─────────────────────────────────────────────┘
```

FIG. 1

OVERLAPPING AND PROGRESSIVE FORMING METHOD FOR HIGH-PERFORMANCE MULTI-ELEMENT NiAl-BASED ALLOY TUBULAR PART

TECHNICAL FIELD

The present disclosure relates to the technical field of precision forming of intermetallic compound tubular parts, and to an overlapping and progressive forming method for a high-performance multi-element NiAl-based alloy tubular part.

BACKGROUND

NiAl alloy is an advanced high-temperature resistant structural material, which has the characteristics of low density, high specific strength/stiffness and excellent oxidation resistance, and is suitable for the application in hot-end components in the aerospace field. However, due to the characteristics of the intrinsic brittleness and high strength at high temperatures of NiAl alloy, it is impossible to prepare NiAl alloy tube blanks, by means of conventional hot working methods, and further NiAl alloy tubular parts, and is even more difficult to obtain high-performance alloyed NiAl components. Patent publication No. CN110142332A provides an integrated method for forming and performance control of NiAl alloy thin-walled tubular parts. In this method, Ni foil and Al foil are used as raw materials, and the NiAl alloy thin-walled tubular part is obtained through lamination, gas pressure forming and reaction synthesis. Patent publication No. CN111804810A provides a forming method of NiAl alloy complex thin-walled hollow components. In this method, Ni foil and Al foil are only used as raw materials, and the preparation of the NiAl alloy components is realized through tube rolling, hot-pressing overlapped joint, reaction-diffusion and the like. However, the raw materials used in the above two methods are only Ni foil and Al foil, which are too single. The phase composition of prepared NiAl intermetallic compound tubular parts is only a single-phase structure, which has low plasticity at room temperature and insufficient high-temperature strength, and cannot meet satisfactory performance requirements. In addition, the above methods have problems of low efficiency in forming and reaction synthesis. Patent publication No. CN111168407A provides an integrated manufacturing method of high-temperature resistant thin-walled components by laying metal foil strips to prepare blanks. In this method, a metal foil strip with a certain width is continuously wound around a mould, and the thin-walled integral component is obtained through gas pressure forming, reaction synthesis and densification treatment. However, in view of a complex curved surface, an integral laminated blank cannot be obtained only by winding of metal foil strips under tension, and the air leakage is easy to occur in the process of internal high pressure forming, making it impossible to obtain components with a uniform structure and high density.

SUMMARY

An objective of the present disclosure is to provide an overlapping and progressive forming method for a high-performance multi-element NiAl-based alloy tubular part, such that the NiAl-based alloy tubular partcan be precisely formed and efficiently reaction synthesized, and the NiAl-based alloy tubular part with a uniform structure and few defects may be prepared.

To achieve the above objective, the present disclosure provides the following:

The present disclosure provides an overlapping and progressive forming method for a high-performance multi-element NiAl-based alloy tubular part, comprising:

S1: winding continuously flexible substrates of Ni and Al, and alloying coating continuously or selectively along a width direction or a rolling direction to obtain coated flexible substrates;

S2: winding continuously the coated flexible substrates on an outer surface of a core roller according to a sequence of Ni above and Al below to form a Ni/Al laminated structure having a plurality of layers with an outermost layer of the Ni/Al laminated structure being a Ni layer, and consolidating with ultrasonic with assistance of a pulse current to combine the continuously wound flexible substrates into a laminated tube blank; and S3: placing the laminated tube blank into a mold, applying a pulse current to both ends of the laminated tube blank for hot fluid high-pressure forming, and synthesizing in-situ to prepare the high-performance multi-element NiAl-based alloy tubular part with assistance of the pulse current.

In some embodiments, before coating, an alloying design for the NiAl-based alloy tubular part to be prepared is conducted, an initial thickness of the Ni and Al flexible substrates is obtained through calculation, and a heat treatment state of the flexible substrates is determined; in S2, a thickness ratio of the Ni flexible substrate to the Al flexible substrate is 1:1.5.

In some embodiments, before S1, surfaces of the flexible substrates of Ni and Al are cleaned by physical and chemical methods to remove oil impurities and oxide films on the surfaces.

In some embodiments, a process for the coating includes magnetron sputtering coating, electro-coating, electro-evaporation coating and multi-arc ion coating.

In some embodiments, an alloying target used in the magnetron sputtering coating comprises a single target or a combined target containing at least one element selected from the group consisting of Cr, Fe, Ti, V, Mn, Mo, Nb, Y and Hf.

In some embodiments, in S2, when a roll-welding electrode of the consolidation with ultrasonic is in contact with the Al flexible substrate, a consolidation speed is in a range of 2-50 mm/s, an amplitude is in a range of 10-50 μm, and a pressure is in a range of 1-20 kN; when a roll-welding electrode of the consolidation with ultrasonic is in contact with the Ni flexible substrate, a consolidation speed is in a range of 5-50 mm/s, an amplitude is in a range of 15-50 μm, and a pressure is in a range of 10-20 kN.

In some embodiments, in S3, the laminated tube blank is encapsulated in a vacuum bag, and is subjected to the hot fluid high-pressure forming with assistance of the pulse current in the mold in an atmospheric environment; alternatively, the laminated tube blank is placed in vacuum or in an inert gas environment, and is subjected to the hot fluid high-pressure forming with assistance of the pulse current in the mold.

In some embodiments, a heating mode of the hot fluid high-pressure forming comprises pulse current assisted heating, electromagnetic induction heating and thermal radiation heating, and a setting temperature of the hot fluid high-pressure forming is in a range of 300-600° C. and a forming pressure is in a range of 1-50 MPa.

In some embodiments, during the hot fluid high-pressure forming and the in-situ reaction synthesis, an inert gas is introduced into the laminated tube blank as pressure medium, and the inert gas comprises nitrogen, helium or argon.

In some embodiments, in S3, during the in-situ reaction synthesis to prepare the high-performance multi-element NiAl-based alloy tubular part in the mold, a reaction synthesis temperature is set in a range of 1000-1500° C., a pressure is in a range of 10-100 MPa, and a time duration is in a range of 1-20 hours; the mold has a function of regional temperature control, such that a regional plasticity control of components is realized during the forming of the high-performance multi-element NiAl-based alloy tubular part, and a regional performance control of components is realized during the reaction synthesis of the high-performance multi-element NiAl-based alloy tubular part.

The present disclosure has the following beneficial effects.

The flexible substrate can be selectively alloying coated to prepare components that meet the differentiated requirements on performance in different areas, so that the performance in each area of the components is controllable and adjustable.

The technology of consolidation with ultrasonic with assistance of current is used, which can not only establish reliable bonding between Ni foil and Al foil after alloy coating, but also significantly reduce the thickness of the intermetallic compound layer between Ni/Al foil bonding interfaces, thereby improving the plastic forming ability of laminated tube blanks.

In the case that the laminated tube blank is formed by pulse current, the tube blank can be heated rapidly due to the actions of electroplasticity and Joule heat, and the forming is short in time and high in efficiency.

In the case that pulse current is applied to the formed laminated tubular part for reaction synthesis, with the help of continuous diffusion reaction and solid phase transformation, an efficient reaction synthesis of the tubular part is realized, and NiAl-based alloy components with a uniform structure and few defects are finally prepared.

BRIEF DESCRIPTION OF THE DRAWINGS

In order to describe the technical schemes in the embodiments of the present disclosure more clearly, the following will briefly introduce the drawings required to be used in the description of the examples. It is evident that the drawings in the following description are only examples of the present disclosure, and those ordinary skilled in the art may still obtain other drawings based on the provided drawings without creative work.

FIG. 1 is a process flow chart of the overlapping and progressive forming method for a high-performance multi-element NiAl-based alloy tubular part according to the present disclosure;

Figure 2:
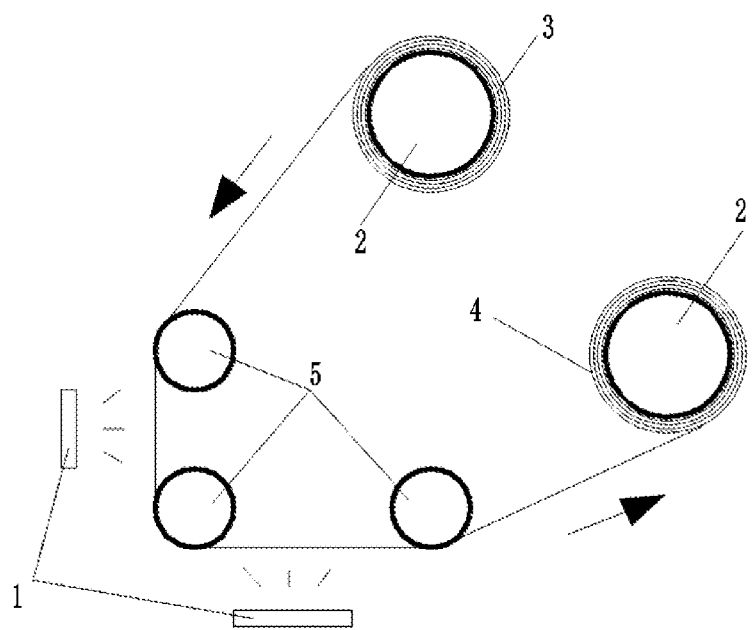
FIG. 2 is a process flow chart of S1 in the present disclosure.

in which illustrative features are assigned the following reference numerals: 1—magnetron sputtering device, 2—core roller, 3—flexible substrate, 4—alloyed substrate, 5—tension roller, 6—platform, 7—ultrasonic consolidation roll—welding electrode, 8—laminated tube blank, 9—NiAl—based alloy tubular part, 10—first electrode, 11—second electrode, 12—air pressure controller, 13—high pressure air source, 14—power source, 15—upper die, 16—lower die, 17—thermocouple, 18—left punch and 19—right punch.

DETAILED DESCRIPTION

The examples of the present disclosure will be clearly and completely described below with reference to drawings in the examples. It is evident that the described examples are only a part of examples and not all of them. Based on the examples of the present disclosure, all other examples obtained by those ordinary skilled in the art without creative work shall fall within the protection scope of the present disclosure.

An objective of the present disclosure is to provide an overlapping and progressive forming method for a high-performance multi-element NiAl-based alloy tubular part, such that the NiAl-based alloy tubular part may be precisely formed and efficiently reaction synthesized, and the NiAl-based alloy components with a uniform structure and few defects may be prepared.

In order to make the above-mentioned objectives, features and advantages of the present disclosure more clearly and easy to understand, the present disclosure will be described in further detail below with reference with drawings and detailed description.

Example 1

As shown in FIG. 1 to FIG. 5, this example provided an overlapping and progressive forming method for a high-performance multi-element NiAl-based alloy tubular part, which was performed by the following steps:

S1: flexible substrates 3 of Ni and Al were wound continuously, and alloying coated continuously or selectively along the width direction or rolling direction. Before S1, the surfaces of flexible substrates 3 of Ni and Al were required to be cleaned by physical and chemical methods to remove the oil impurities and oxide films on the surfaces. Among them, the physical method was to clean up the oil stain and oxide film by steel brush grinding, sandblasting grinding and the like, and the chemical method was to clean up the oil stain and oxide film by chemical reagents such as HF and NaOH. Both the Ni flexible substrate and the Al flexible substrate could be alloying coated continuously or selectively by reference to the process steps shown in FIG. 2.

In S1, the process for the coating included magnetron sputtering coating, electro-coating, electro-evaporation coating and multi-arc ion coating. The surfaces of the flexible substrates 3 of Ni and Al were magnetron sputtering coated in a continuous-winding mode or an area-selective mode along the rolling direction or width direction to meet the requirements on alloying and plastic forming. The alloying target used in the magnetron sputtering coating included a single target or a combined target containing at least one element selected from the group consisting of Cr, Fe, Ti, V, Mn, Mo, Nb, Y and Hf. In this example, a magnetron sputtering device 1 was used for magnetron sputtering coating to obtain alloyed substrates 4. Before coating, an alloying design for the NiAl-based alloy tubular part 9 to be prepared was conducted, the initial thickness of the flexible substrates 3 of Ni and Al was obtained by calculation, and the heat treatment state of the flexible substrates 3 was determined. The high-purity Ni foil was a Ni foil material with a purity of no less than 99.99%, and the high-purity Al foil was an Al foil material with a purity of no less than 99.99%. In this example, the high-purity Ni foil and the high-purity Al foil were used as the raw materials of the flexible substrates 3, and the components were alloyed by coating technologies such as magnetron sputtering coating, electro-evaporation coating and multi-arc ion coating, so that the high-performance NiAl-based alloy components could be prepared.

Among them, the flexible substrates 3 can also be a combination of high-purity Ni foils and high-purity Al foils with different thicknesses to prepare Ni—NiAl—Ni3Al composite tubular parts; the flexible substrates 3 can also be a combination of high-purity Fe foils and high-purity Al foils with different thicknesses to prepare FeAl alloy tubular parts; the flexible substrate 3 can also be a combination of high-purity Ti foils and high-purity Al foils with different thicknesses to prepare TiAl alloy tubular parts.

Calculation for designing the thickness ratio of the Ni foil to the Al foil is as follows:

$$N = n \cdot N_A \quad (1)$$

in which: N represents the number of atoms, n represents the amount of substance and $N_A$ represents the Avogadro constant;

$$m = n \cdot M \quad (2)$$

in which: m represents the mass, n represents the amount of substance and M represents the molar mass of substance;

$$h = \frac{m}{\rho \cdot S} \quad (3)$$

in which: h represents the height, m represents the mass, ρ represents the density and S represents the cross-sectional area;

also known: $\rho_{Ni}$=8.902 g cm³, $M_{Ni}$=58.69 g/mol; $\rho_{Al}$=2.70 g cm³, $M_{Al}$=26.98 g/mol;
according to $N_{Ni}$: $N_{Al}$=1:1,
according to formula (1), formula (2) and formula (3), the thickness ratio of the Ni foil to the Al foil can be obtained:

$$h_{Ni}:h_{Al} \approx 1:1.5.$$

Figure 3:
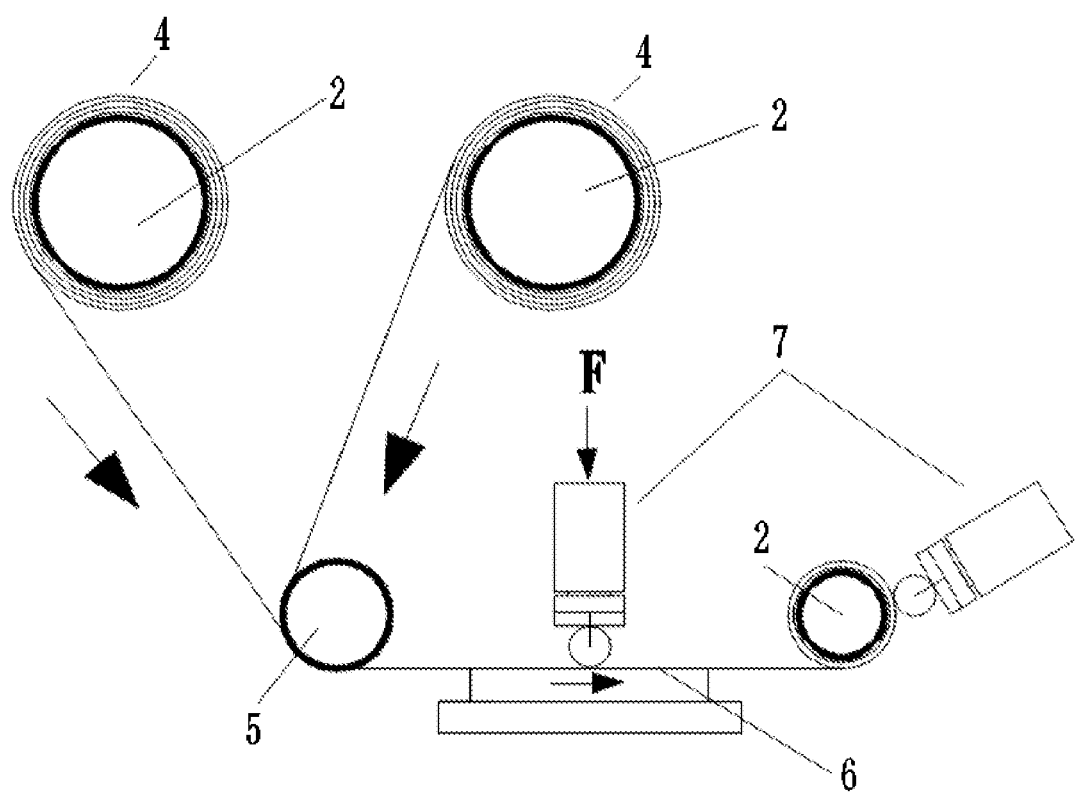
FIG. 3 is a structural diagram of S2 in the present disclosure.
Figure 4:
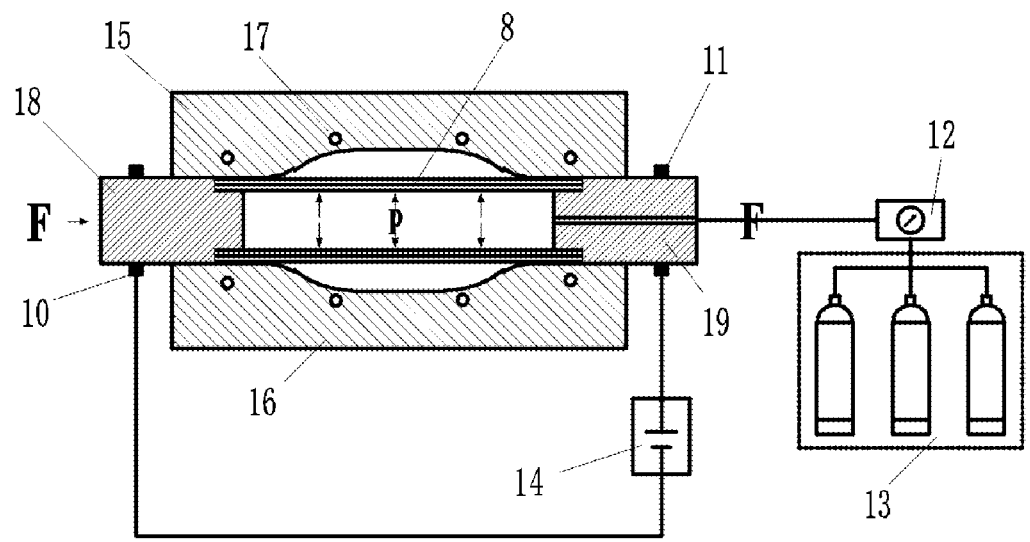
FIG. 4 is a first structural diagram of S3 in the present disclosure.
Figure 5:
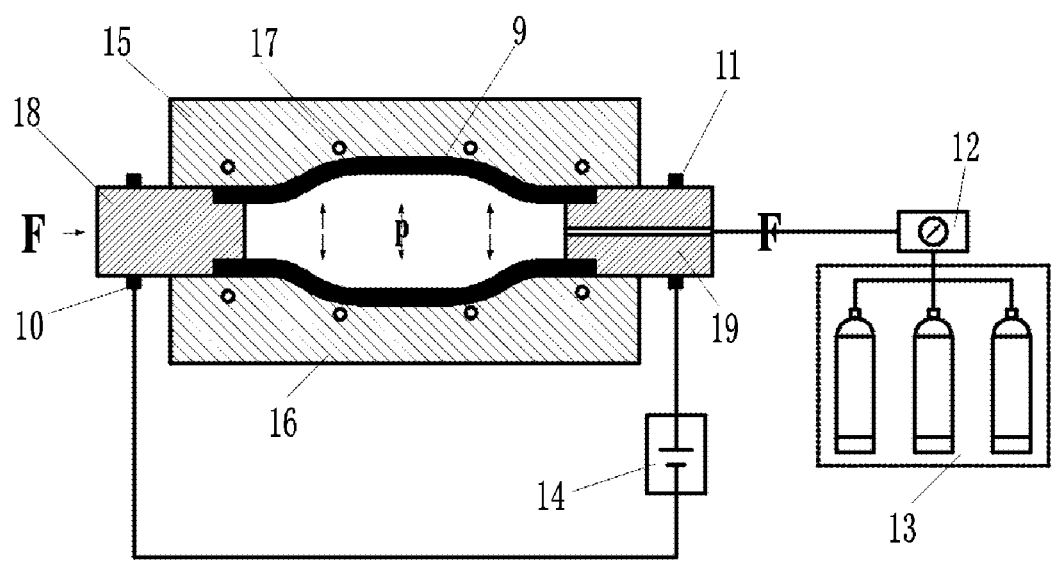
FIG. 5 is a second structural diagram of S3 in the present disclosure.

S2: the coated flexible substrates 3 were continuously wound on the outer surface of a core roller 2 according to the sequence of Ni above and Al below to form a Ni/Al laminated structure with several layers, the outermost layer of the Ni/Al laminated structure was meanwhile ensured to be a Ni layer, and the Ni/Al laminated structure was consolidated by using ultrasonic with assistance of a pulse current, so that the continuously wound flexible substrates 3 were combined into a laminated tube blank 8. In this example, as shown in FIG. 3, the coated Ni flexible substrate was on the left core roller 2, the coated Al flexible substrate was on the right core roller 2, and the thickness ratio of the Ni flexible substrate to the Al flexible substrate was 1:1.5. Among them, when an ultrasonic consolidation roll-welding electrode 7 was in contact with the Al flexible substrate 3, the consolidating speed was in a range of 2-50 mm/s, the amplitude was in a range of 10-50 μm, and the pressure was in a range of 1-20 kN. When an ultrasonic consolidation roll-welding electrode 7 was in contact with the Ni flexible substrate 3, the consolidating speed was in a range of 5-50 mm/s, the amplitude was in a range of 15-50 μm and the pressure was in a range of 10-20 kN.

S3: the laminated tube blank 8 was placed into a mold, and a pulse current was applied to both ends of the laminated tube blank 8 for hot fluid high-pressure forming, such that with assistance of the pulse current, the high-performance multi-element NiAl-based alloy tubular part 9 was in-situ synthesized. Among them, the laminated tube blank 8 was encapsulated in a vacuum bag, and was subjected to the hot fluid high-pressure forming with assistance of pulse current in the mold in an atmospheric environment. Or the laminated tube blank 8 was placed in vacuum or in an inert gas environment, and was subjected to the hot fluid high-pressure forming with assistance of pulse current in the mold. The heating modes of the hot fluid high-pressure forming included pulse current assisted heating, electromagnetic induction heating and thermal radiation heating. The setting temperature of the hot fluid high-pressure forming was in a range of 300-600° C., and the forming pressure was in a range of 1-50 MPa. During the hot fluid high-pressure forming and the in-situ reaction synthesis, an inert gas was introduced into the laminated tube blank 8 as the pressure medium, and the gas pressure was regulated by an air pressure controller 12. The inert gas (protective gas source) included nitrogen, helium or argon.

In S3, during the in-situ reaction synthesis to prepare the high-performance multi-element NiAl-based alloy tubular part 9 in the mold, the reaction synthesis temperature was set in a range of 1000-1500° C., the pressure was in a range of 10-100 MPa, and the time duration was in a range of 1-20 hours. The upper die 15 and the lower die 16 were respectively provided with a thermocouple 17, such that they both had the function of regional temperature control, by which a regional plasticity control of components was realized in the forming process of the high-performance multi-element NiAl-based alloy tubular part 9, and a regional performance control of components was realized in the reaction synthesis process of the high-performance multi-element NiAl-based alloy tubular part 9.

Example 2

In this example, an overlapping and progressive forming method for a high-performance multi-element NiAl-based alloy tubular part was performed by the following steps:

S1: the thickness and heat treatment state of a Ni foil and an Al foil were calculated according to an alloying design. According to the calculation, an annealed Ni foil with a purity of 99.99% and a thickness of 60 μm and an annealed Al foil with a purity of 99.99% and a thickness of 100 μm were used. The Ni foil strip was continuously polished on its surface with a sandpaper of 1,000 mesh or more, then was placed in an acetone solution pool for ultrasonic cleaning for 30 min, stood and dried by cold air, subsequently was placed in a 10% NaOH solution pool for ultrasonic cleaning for 30 min, taken out and placed in a distilled water pool for ultrasonic cleaning for 1 h, and finally was taken out after ultrasonic cleaning for 30 min in an absolute ethanol solution pool, stood and dried by cold air. The Al foil strip was continuously polished on its surface with a sandpaper of 1,000 mesh or more, then was placed in an acetone solution pool for ultrasonic cleaning for 30 min, stood and dried by cold air, subsequently was placed in an HF solution pool with a volume percentage of 10% for ultrasonic cleaning for 30 min, taken out and placed in a distilled water pool for ultrasonic cleaning for 1 h, and finally was taken out after ultrasonic cleaning for 30 min in an absolute ethanol solution pool, stood and dried by cold air. The cleaned Ni and Al foil strips were continuously wound on the surface of a feed roller. One side of the surface of the Ni foil was coated with a coating or a combined coating containing at least one element selected from the group consisting of Cr, Fe, Ti, V, Mn, Mo, Nb, Y and Hf by the electro-coating. The thickness of the coating was in a range of 1 μm-100 μm.

S2: the coated Ni foil strip and Al foil strip (as shown in FIG. 3, the coated Ni foil strip and Al foil strip were on the two core rollers 2 in turn), under the actions of the tension roller 5 and the core rollers 2, were in close contact with each other. The Ni foil strip and Al foil strip were consolidated to form a Ni/Al composite foil strip when they passed between the ultrasonic consolidation roll-welding electrode 7 and the platform 6, with the consolidation speed in a range of 5-50 mm/s, the amplitude in a range of 10-50 μm and the pressure in a range of 5-20 kN. Then, the Ni/Al composite foil strip was continuously wound on the outer surface of a core roller 2, and an ultrasonic consolidation roll-welding electrode 7 was arranged outside the core roller 2, such that the Ni/Al composite foil strip was combined to form a Ni/Al laminated iterative roll with several layers. The Ni/Al laminated iterative roll was further processed into the laminated tube blank 8 by laser cutting and core pulling. When the ultrasonic consolidation roll-welding electrode 7 was in contact with the Al foil strip, the parameters were as follows: the consolidation speed was in a range of 10-50 mm/s, the amplitude was in a range of 20-50 μm, and the pressure was in a range of 5-20 kN. When the ultrasonic consolidation roll-welding electrode 7 was in contact with the Ni foil strip, the parameters were as follows: the consolidation speed was in a range of 5-20 mm/s, the amplitude was in a range of 15-30 μm, and the pressure was 10 kN. Among them, it was necessary to ensure that the outermost layer of the laminated structure was a Ni layer, in which the Ni layer was wound with 11 layers, and the Al layer was wound with 10 layers.

(3) The laminated tube blank 8 was placed at the designated position of the lower die 16, and the upper die 15 moved downward. After the mold was closed, the left punch 18 (equipped with the first electrode 10) and the right punch 19 (equipped with the second electrode 11) moved toward the laminated tube blank 8, respectively. After sealing, the power source 14 supplied power to the first electrode 10 and the second electrode 11, and a pulse current was applied to assist in heating the laminated tube blank 8. When the temperature of the laminated tube blank 8 reached 550° C., the high-pressure air source 13 was used for pressure control via the air pressure controller 12 to continuously introduce gas into the tubular part, with the air pressure loading rate in a range of 0.1-10 MPa/s and the maximum pressure of 35 MPa, thereby realizing the hot fluid high-pressure forming in a vacuum environment; during the hot fluid high-pressure forming, the high-purity inert gas argon was introduced into the tubular part as the pressure medium.

(4) The pulse current was continuously applied to the laminated tube blank 8 after the hot fluid high-pressure forming for reaction synthesis, and the high-performance multi-element NiAl-based alloy tubular part 9 was finally prepared by in-situ reaction in the mold. The reaction synthesis of the formed tubular part was performed at the temperature of 1100° C., the pressure of 50 MPa and the time duration of 1-5 hours. During the in-situ reaction, the high-purity inert gas argon was introduced into the tubular part as the pressure medium.

In this specification, specific examples are used to explain the principle and implementation of the present disclosure, and the descriptions of the above examples are only used to help understand the method and core ideas of the present disclosure. At the same time, according to the idea of the present disclosure, there will be changes in the specific implementation and application scope for those ordinary skilled in this field. To sum up, the content of this specification should not be construed as a limitation of the present disclosure.

The invention claimed is:

1. An overlapping and progressive forming method for a high-performance multi-element NiAl-based alloy tubular part, comprising:
    winding continuously flexible substrates of Ni and Al, and coating continuously or selectively along a width direction or a rolling direction to obtain coated flexible substrates;
    winding continuously the coated flexible substrates on an outer surface of a core roller according to a sequence of Ni above and Al below to form a Ni/Al laminated structure having a plurality of layers with an outermost layer of the Ni/Al laminated structure being a Ni layer, and consolidating with ultrasonic with assistance of a pulse current to combine the continuously wound flexible substrates into a laminated tube blank; and
    placing the laminated tube blank into a mold, applying a pulse current to both ends of the laminated tube blank for hot fluid high-pressure forming, and synthesizing in-situ to prepare the high-performance multi-element NiAl-based alloy tubular part with assistance of the pulse current.

2. The method according to claim 1, wherein before coating, an alloying design for the NiAl-based alloy tubular part to be prepared is conducted, an initial thickness of the Ni and Al flexible substrates is obtained through calculation, and a heat treatment state of the flexible substrates is determined;
    wherein a thickness ratio of the Ni flexible substrate to the Al flexible substrate is 1:1.5.

3. The method according to claim 1, wherein before winding continuously flexible substrates of Ni and Al, surfaces of the flexible substrates of Ni and Al are cleaned by physical and chemical methods to remove oil impurities and oxide films on the surfaces.

4. The method according to claim 1, wherein a process for the coating includes magnetron sputtering coating, electro-coating, electro-evaporation coating and multi-arc ion coating.

5. The method according to claim 4, wherein an alloying target used in the magnetron sputtering coating comprises a single target or a combined target containing at least one element selected from the group consisting of Cr, Fe, Ti, V, Mn, Mo, Nb, Y and Hf.

6. The method according to claim 1, wherein when a roll-welding electrode of the consolidation with ultrasonic is in contact with the Al flexible substrate, a consolidation speed is in a range of 2-50 mm/s, an amplitude is in a range of 10-50 μm, and a pressure is in a range of 1-20 kN; when a roll-welding electrode of the consolidation with ultrasonic is in contact with the Ni flexible substrate, a consolidation speed is in a range of 5-50 mm/s, an amplitude is in a range of 15-50 μm, and a pressure is in a range of 10-20 kN.

7. The method according to claim 1, wherein the laminated tube blank is encapsulated in a vacuum bag and is subjected to the hot fluid high-pressure forming with assistance of the pulse current in the mold in an atmospheric environment; or the laminated tube blank is placed in vacuum or in an inert gas environment, and is subjected to the hot fluid high-pressure forming with assistance of the pulse current in the mold.

8. The method according to claim 1, wherein a heating mode of the hot fluid high-pressure forming comprises pulse current assisted heating, electromagnetic induction heating and thermal radiation heating, and wherein a setting temperature of the hot fluid high-pressure forming is in a range of 300-600° C. and a forming pressure is in a range of 1-50 MPa.

9. The method according to claim 1, wherein during the hot fluid high-pressure forming and the in-situ reaction synthesis, an inert gas is introduced into the laminated tube blank as pressure medium, and the inert gas comprises nitrogen, helium or argon.

10. The method according to claim 1, wherein during the in-situ reaction synthesis to prepare the high-performance multi-element NiAl-based alloy tubular part in the mold, a reaction synthesis temperature is set in a range of 1000-1500° C., a pressure is in a range of 10-100 MPa, and a time duration is in a range of 1-20 hours;
  wherein the mold has a function of regional temperature control, a regional plasticity control of components is realized during the forming of the high-performance multi-element NiAl-based alloy tubular part, and a regional performance control of components is realized during the reaction synthesis of the high-performance multi-element NiAl-based alloy tubular part.

* * * * *